Oct. 23, 1945.    E. W. GARDNER ET AL    2,387,654
AMMUNITION MACHINERY
Filed Dec. 27, 1943    2 Sheets-Sheet 1

INVENTORS
EARL W. GARDNER
WILLIAM F. NICKUM
BY
ATTORNEYS

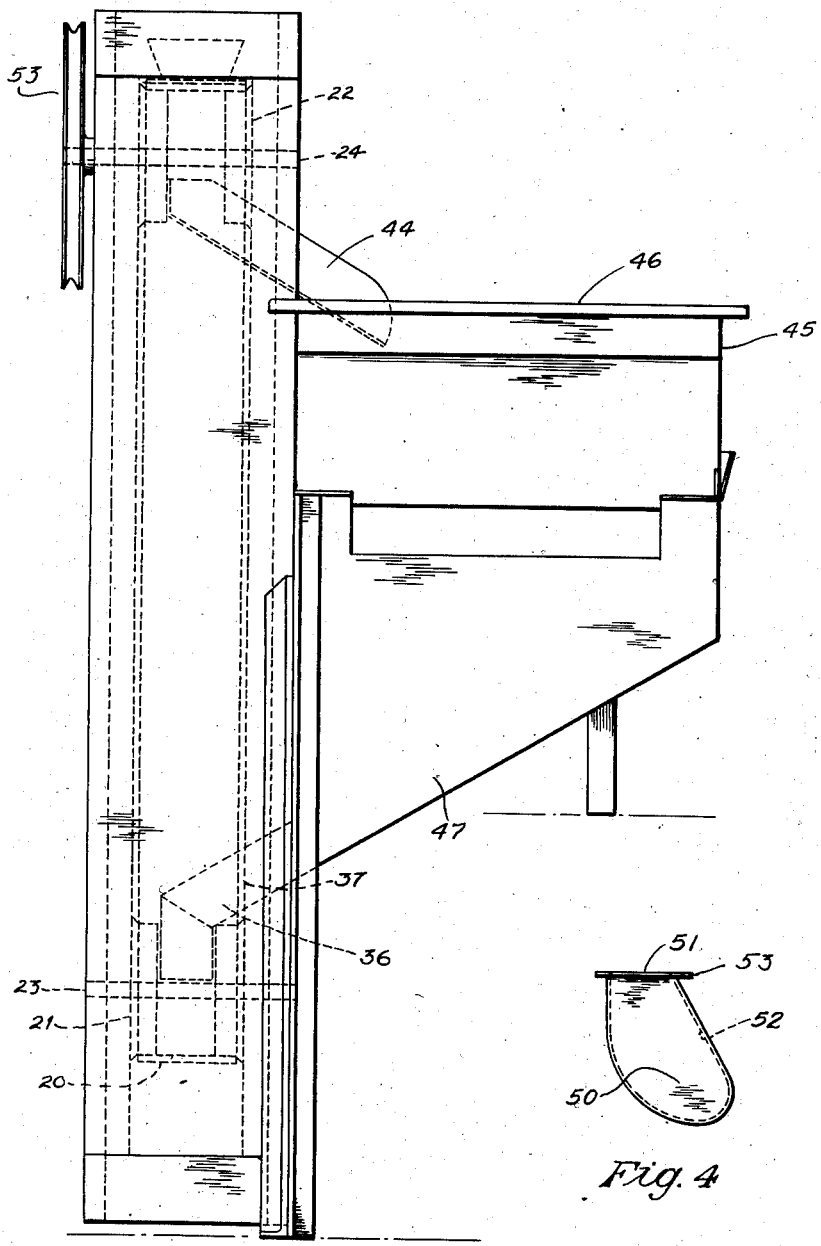

Patented Oct. 23, 1945

2,387,654

UNITED STATES PATENT OFFICE 2,387,654

AMMUNITION MACHINERY

Earl W. Gardner and William F. Nickum, Salt Lake City, Utah, assignors to Remington Arms Company, Inc., Bridgeport, Conn., a corporation of Delaware Application December 27, 1943, Serial No. 515,656

1 Claim. (Cl. 198—141)

This invention relates to ammunition making machinery and particularly to a means for conveying elements, such as primer components, or primer assemblies. In the handling of components of primers such as the cups, it is desirable to handle with care so as to prevent injury. The elements are small and easily scattered so that the conveyor system should be one which handles the articles carefully and confines them to prevent loss and scattering. As an example, the primer cup of a caliber .30 cartridge is about 0.2" in diameter and 0.12" high. These and other objects of the invention will become apparent from the following drawings and description which are merely exemplary of the invention.

In the drawings:

Fig. 4 is a detailed side view of one of the primer conveyor pockets.

Fig. 5 is a schematic elevation of the conveyor as employed with a primer shaker machine.

Figure 1:
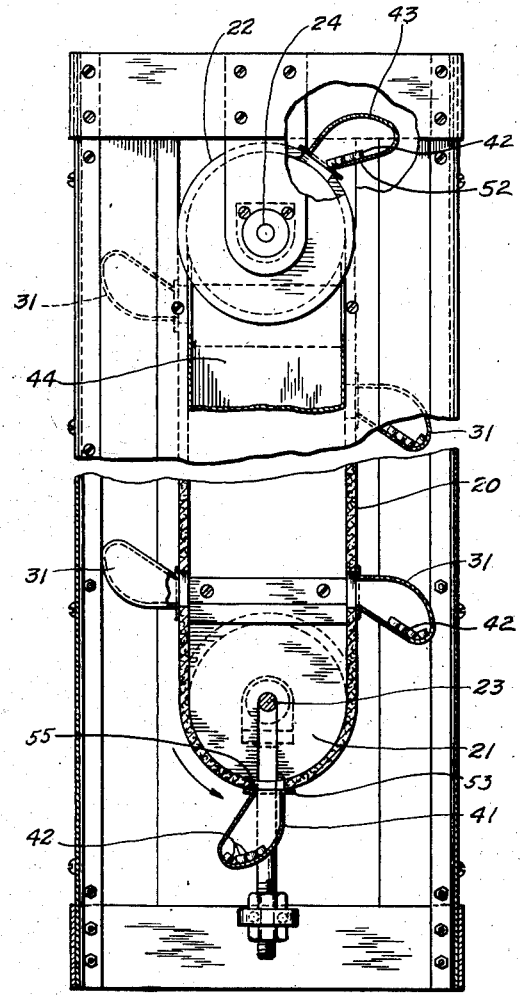
Fig. 1 is a vertical elevation partially in section and broken in the center of a conveyor embodying the invention, the lower half being in section and the upper half a side view looking from the left of Fig. 2.
Figure 2:
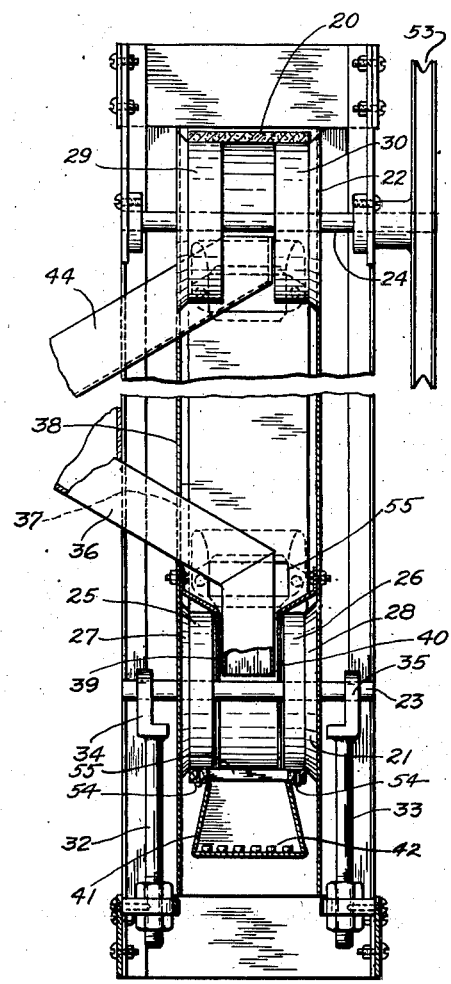
Fig. 2 is a side view of Fig. 1 and is partly in section.
Figure 3:
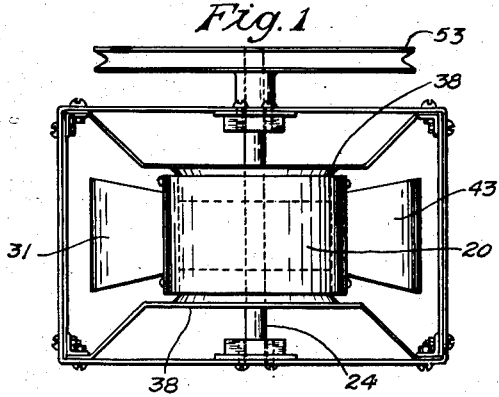
Fig. 3 is a top view of Fig. 1.

Referring to the drawings, belt 20 may be made of leather or any other suitable material. The belt is carried between the lower set of pulleys at 21 and the upper set at 22. The pulleys are mounted on shafts 23 and 24. The lower set of pulleys 21 comprise two pulleys 25 and 26, which have a flange 27 and 28, said flanges serving to guide the belt 20. The upper set of pulleys is similar to the lower set and comprises two pulleys 29 and 30.

The primer or article receiving pockets are indicated at 31, details thereof being shown in Fig. 4. The shaft 23 may be adjustably supported on posts 32 and 33, said posts carrying the journals 34 and 35. Either shaft 23 or 24 may be driven by a pulley by a suitable means of power not shown in order to rotate the belt to elevate articles from a lower position to an upper position. In the form shown, the driving pulley is indicated at 53.

The primers, or other objects, are directed to the interior of the conveyor through chute 36, which enters the interior chamber through a hole 37 cut in the side wall 38 of the conveyor frame or cover plates. Guide plates 39 and 40 serve to direct the cups away from the pulleys and into the primer receiving pockets, one of said pockets being shown at 41 at the bottom point of travel of the belt. The primers are shown diagrammatically at 42 in the lowermost pocket 41. As the belt revolves in the direction shown by the arrow in Fig. 1, the primer receiving pockets are carried upwardly to the position shown at 31 and up to 43. At the point shown at 43, the primers in the pocket slide around the smooth interior wall of the pocket ready to drop out onto chute 44. Chute 44 directs the primers from the machine in any desired direction. The shape of the pockets is made such that the cups will slide smoothly on the surface thereof and will drop therefrom into the chute 44 without any undue accelerated motion. The form of pocket shown in Fig. 4 comprises two radii and straight surfaces, although it is evident that other geometrical surfaces may be selected to give the desired smooth action without abrupt dropping. It is desirable that there be an enlarged chamber 50 remote from the opening 51 of the pocket and that the chamber be joined by a smooth or gradually curving surface 52 therewith.

In this manner, primers will fall into the pocket when the pocket is in the lowermost position. The cups will then move toward the enlarged chamber 50 as the pocket is carried upwardly by the belt. When the pocket is carried around the upper set of pulleys, the primers will gradually slide along the surface 52 to the opening 51 and fall into the discharge chute.

The flanges 53 of the pockets may be fastened to the belt 20 by rivets 54, or by any suitable means, there being openings 55 cut in the belt as indicated.

One use of the machine is seen in Fig. 5 wherein a primer shaker plate machine is shown diagrammatically at 45. This machine is described in detail in a copending application Serial Number 514,390 filed December 15, 1943. The primers are fed into the hopper top 46 and are shaken into a primer plate thereunder. The excess primers fall into the bin 47 and are carried by means of the chute 36 into the conveyor of the present invention. The conveyor of the present invention then raises the primers and delivers them to the chute 44 which returns the excess primer cups to the hopper 46. The belt, pulleys and other parts are merely shown in diagrammatic form in Fig. 5, as their construction is found in detail in the other figures of the drawings.

It is apparent that other articles than primer cups may be handled by the present invention, the device being particularly adaptable for handling small objects without damage, although it is to be understood that it is not limited thereto.

What is claimed is:

In a device for vertically elevating loose articles, an upper arbor; a lower arbor; a pair of spaced counterpart pulleys secured to each of said arbors, each pulleys of each pair comprising a flange adapted for engagement with one edge of a belt; a continuous belt of strip material extending between and passing around said pairs of pulleys, there being spaced apertures in said belt; article receiving pockets secured to the margins of said apertures and extending outwardly therefrom, said pockets being transversely enlarged from their mouth portions at said belt apertures and laterally asymmetric to afford a support for articles therein during the vertical upward movement thereof; means for introducing articles into said pockets between said lower pair of spaced pulleys; and means for receiving articles delivered from said pockets between said upper pair of spaced pulleys.

EARL W. GARDNER.
WILLIAM F. NICKUM.